(12) United States Patent
Chen et al.

(10) Patent No.: US 7,616,708 B2
(45) Date of Patent: Nov. 10, 2009

(54) CLOCK RECOVERY CIRCUIT

(75) Inventors: Po-Wen Chen, Sansia Township, Taipei County (TW); Chih-Kang Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 607 days.

(21) Appl. No.: 11/405,047

(22) Filed: Apr. 17, 2006

(65) Prior Publication Data
US 2007/0242778 A1 Oct. 18, 2007

(51) Int. Cl.
*H04L 27/00* (2006.01)
(52) U.S. Cl. .................. 375/326; 375/376; 375/373; 375/360; 375/327
(58) Field of Classification Search .............. 375/326, 375/376, 373, 360, 327; 327/156
See application file for complete search history.

(56) References Cited
U.S. PATENT DOCUMENTS

| | | | |
|---|---|---|---|
| 5,173,617 A * | 12/1992 | Alsup et al. ............ | 327/158 |
| 5,663,665 A | 9/1997 | Wang et al. ............ | 327/3 |
| 6,137,325 A * | 10/2000 | Miller, Jr. ............ | 327/156 |
| 6,281,726 B1 * | 8/2001 | Miller, Jr. ............ | 327/156 |
| 6,750,688 B2 * | 6/2004 | Takai ............ | 327/158 |
| 6,862,015 B2 | 3/2005 | Fujioka et al. ............ | 345/98 |

* cited by examiner

*Primary Examiner*—Ted M Wang
(74) *Attorney, Agent, or Firm*—J.C. Patents (57) ABSTRACT

A clock recovery circuit comprising an initial delay select circuit, a delay locked loop and a clock synthesizer circuit is provided. The initial delay select circuit comprises an initial timing generator, a first multiplexer and an initial value generator. The delay locked loop comprises a delay chain, a phase detector, a counter, and a decoder circuit. The delay locked loop delays an input clock signal to generate a first delay signal and several unit delay signals. The initial value generator receives the unit delay signals to generate an initial value used as an initial counting value of the delay locked loop to prevent harmonic lock. The delay locked loop controls the phase difference between the input clock signal and the first delay signal. The output clock signal of the clock recovery circuit is generated by the clock synthesizer circuit based on the input clock signal and the first delay signal.

16 Claims, 8 Drawing Sheets

CLOCK RECOVERY CIRCUIT

BACKGROUND OF THE INVENTION

1. Field of Invention

The present invention relates to a clock recovery circuit. More particularly, the present invention relates to a clock recovery circuit comprising a delay locked loop (DLL).

2. Description of Related Art

In a liquid crystal display device having an architecture of series-connected source drivers, after being output from a timing controller, signals of data and clock are transmitted from the first source driver to the last one in sequence in a series-connected way.

However, after signals of data and clocks pass through a logic circuit in the source driver, the duty cycle of an input signal having a primary duty cycle of 50% is changed after the input signal has passed through several stages of source drivers one after another due to an asymmetry in the speeds of the input signal at the rising edge and falling edge of signals in the logic circuit, and additionally, because it is impossible for the transmission path of data signals and the transmission path of clock signals to be totally symmetric, when a latter source driver receives an output signal from the one of the previous stages, both the setup time and hold time of the data will change significantly compared with the output of the timing controller, which therefore results in an error of data latch. This situation becomes more and more obvious as the number of the series-connected source drivers increases.

In order to solve this problem, U.S. Pat. No. 6,862,015 provides a clock recovery circuit comprising a phase locked loop (PLL) or a delay locked loop in source drivers. After the duty cycle is adjusted, data signals are output after being synchronized by clock signals such that all signals received by each of the source drivers are synchronized by the previous stage, and therefore the number of the series-connected source drivers may not be limited.

However, although the above problem is solved, a problem of harmonic lock as described in U.S. Pat. No. 5,663,665 still exists in this kind of clock recovery circuit.

SUMMARY OF THE INVENTION

Accordingly, the present invention is directed to provide a clock recovery circuit which is used mainly for solving the problem of harmonic lock occurred in a conventional clock recovery circuit.

In order to achieve the above and other objects, the invention provides a clock recovery circuit comprising a delay locked loop, an initial delay select circuit, and a clock synthesizer circuit. The delay locked loop receives an input signal, and outputs a first delay signal and several unit delay signals, which all result from delaying the input signal. The delay time of the first delay signal is determined based on a counting value. The delay time of each unit delay signal is always longer than that of the previous one. The initial delay select circuit provides an initial value used as an initial counting value to the delay locked loop based on the above several unit delay signals. The clock synthesizer circuit generates an output clock signal based on an input clock signal and the first delay signal. The frequency of the output clock signal is substantially the same as that of the input clock signal, and the duty cycle of the output clock signal is approximate to a preset value.

According to a preferred embodiment of the invention, the initial delay select circuit includes an initial timing generator, an initial value generator, and a first multiplexer. The initial timing generator generates an initial signal, a sampling signal, a clock select signal, and a test signal based on an enable signal and the input clock signal, wherein the delay locked loop captures the initial value when the initial signal is enabled. The initial value generator generates an initial value based on the above several unit delay signals when the sampling signal is enabled. The first multiplexer outputs one of the test signal and the input clock signal to the delay locked loop as an input signal based on the clock select signal.

According to a preferred embodiment of the invention, the initial value generator comprises a comparator and an encoder. The comparator generates several compare signals based on the above several unit delay signals when the sampling signal is enabled. If the nth unit delay signal is not equal to the n+1th unit delay signal, the nth compare signal is in a first state, otherwise, the nth compare signal is in a second state, wherein n is a positive integer. The encoder then generates the initial value based on the above compare signals.

According to a preferred embodiment of the invention, the delay locked loop comprises a delay chain, a phase detector, a counter, and a decoder circuit. The delay chain provides a first delay signal, a second delay signal, and unit select signals, which all result from delaying the input signal. The delay time of the first delay signal is determined based on several first delay select signals, and the delay time of the second delay signal is determined based on several second delay select signals. The phase detector provides an increment indicating signal and a decrement indicating signal based on a phase difference between the input clock signal and the second delay signal. The counter outputs the above counting value, captures the initial value used as a counting value when the initial signal provided by the initial delay select circuit is enabled, and increases or decreases the counting value based on the increment indicating signal and the decrement indicating signal. The decoder circuit generates a first delay select signal and a second delay select signal based on the counting value.

According to a preferred embodiment of the invention, the delay time of the first delay signal is about a half period of the input signal, and the above preset value is about 50%.

According to a preferred embodiment of the invention, the clock synthesizer circuit includes a first frequency divider, a second frequency divider, and an XOR gate. The first frequency divider divides the frequency of the first delay signal by 2 and then outputs it. The second frequency divider divides the frequency of the input clock signal by 2 and then outputs it. The XOR gate receives the output signals from the first frequency divider and the second frequency divider, and thereby generates an output clock signal.

According to a preferred embodiment of the invention, a first delay signal delayed a half period, a second delay signal delayed one period, and several unit delay signals are all generated by delaying the input clock signal by adopting an initial value generator and a delay locked loop. Meanwhile, the initial value generator receives several unit delay signals to generate an initial value used as an initial counting value of the delay locked loop, and meanwhile prevents harmonic lock, i.e. the signal locked by the delay locked loop being a periodic signal beyond one period, from occurring. The delay locked loop precisely controls the phase difference between the first and second delay signals and the input clock signal, and the clock synthesizer circuit generates the output clock signal with a duty cycle of 50% based on the input clock signal and the first delay signal. Therefore, if the duty cycle of the output clock signal is not equal to 50%, this clock recovery circuit will recover the duty cycle of a distorted input clock signal to 50%, and then this recovered clock will be used as an output clock signal for synchronizing the data signal within a source driver and then outputting it to the next source driver, thereby the limitation of the number of stages of the series-connected source drivers is removed. In addition, the above initial value generator may provide a suitable initial counting value such that the delay time of the second delay signal is approximate to one period of the input clock signal just from the beginning, and thereby the problem of harmonic lock is avoided.

In order to make the aforementioned and other objects, features and advantages of the present invention comprehensible, a preferred embodiment accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
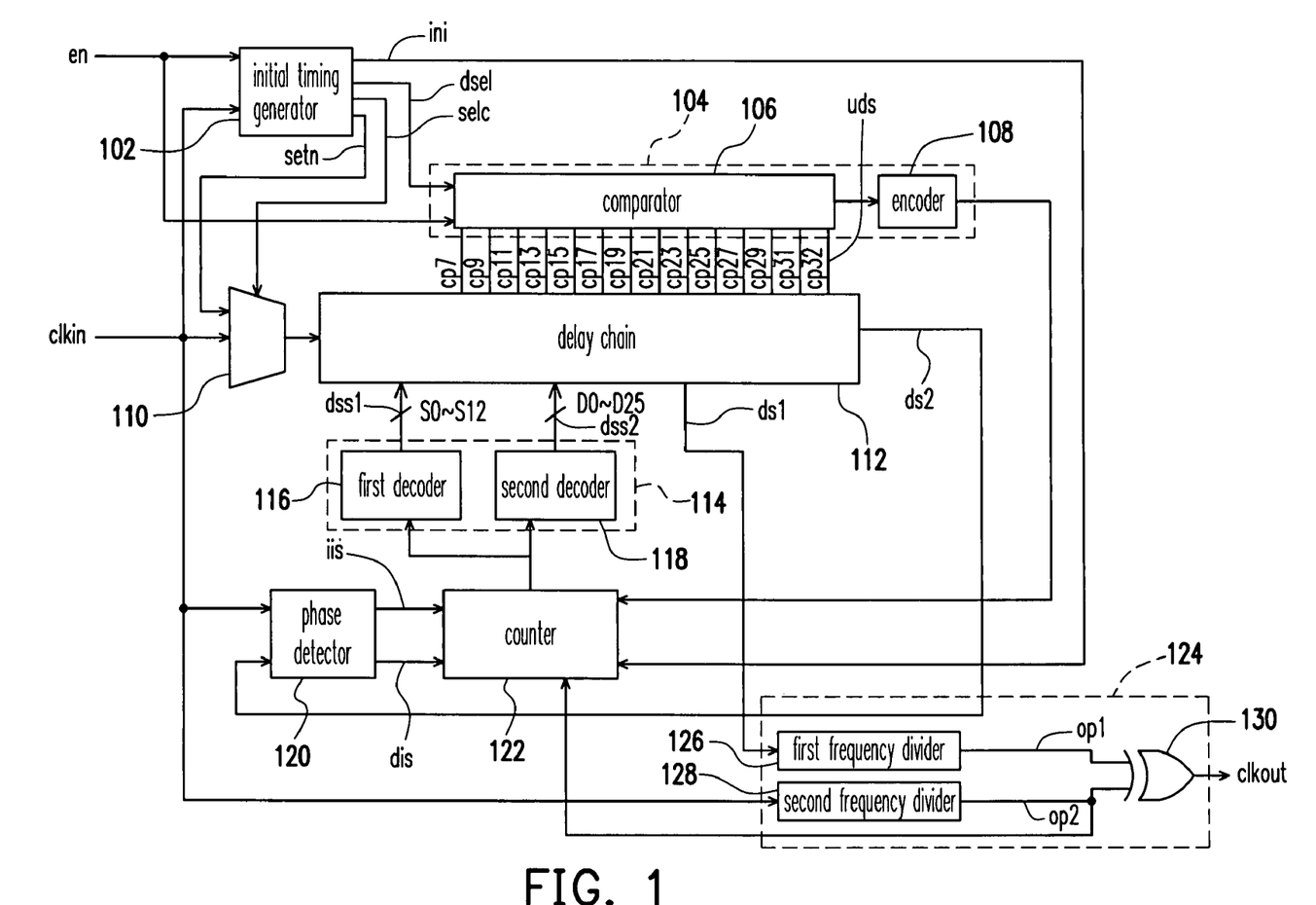
FIG. 1 is a block diagram of a clock recovery circuit device according to a preferred embodiment of the invention.
Figure 2:
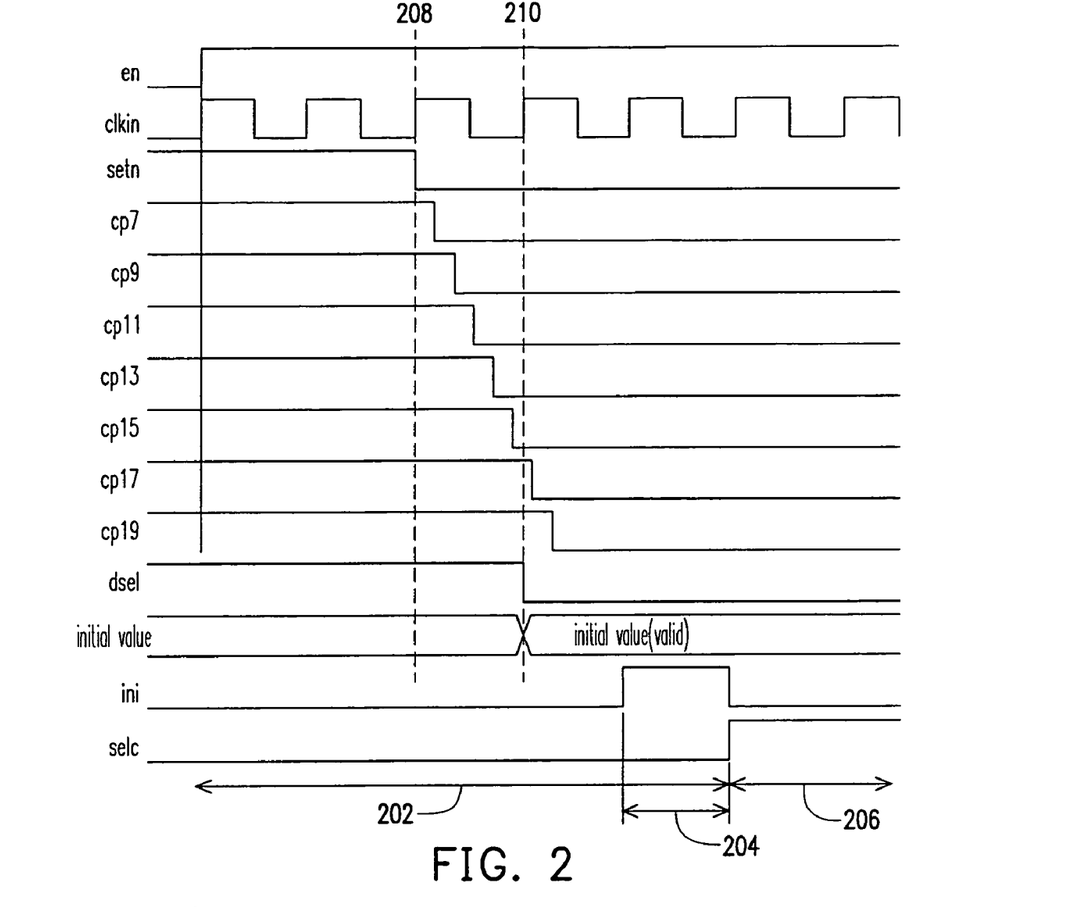
FIGS. 2, 3 are timing diagrams of signals of a clock recovery circuit according to a preferred embodiment of the invention.
Figure 3:
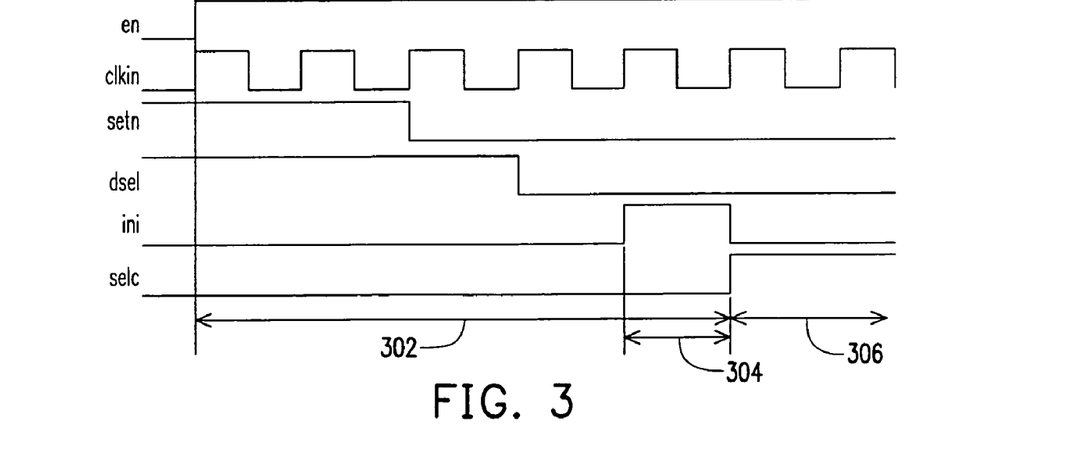

FIG. 1 is a block diagram of a clock recovery circuit device according to a preferred embodiment of the invention, and FIGS. 2 and 3 are timing diagrams of signals of a clock recovery circuit according to a preferred embodiment of the invention. FIGS. 1, 2, and 3 should be referred to jointly in the following description of the embodiments.

FIG. 1 comprises an initial timing generator 102, an initial value generator 104, a first multiplexer 110, a clock synthesizer circuit 124, and a delay locked loop comprising a delay chain 112, a decoder circuit 114, a phase detector 120, and a counter 122. The initial value generator 104 further includes a comparator 106 and an encoder 108, the decoder circuit 114 further includes a first decoder 116 and a second decoder 118, and the clock synthesizer circuit 124 further includes a first frequency divider 126, a second frequency divider 128, and an XOR gate 130.

The initial timing generator 102 receives an enable signal en and an input clock signal clkin, and generates an initial signal ini, a sampling signal dsel, a clock select signal selc, and a test signal setn. The first multiplexer 110 receives the clock select signal selc, the input clock signal clkin, and the test signal setn, while the comparator 106 in the initial value generator 104 receives the sampling signal dsel and the enable signal en. When the initial value generator 104 is enabled by the enable signal en and the clock select signal selc is at a low potential, the clock recovery circuit enters into an initial set period (as shown by 202 in FIG. 2 and 302 in FIG. 3). At this time, the first multiplexer 110 selectively receives the test signal setn, and outputs the test signal setn to the delay chain 112 to be delayed, so as to generate several unit delay signals uds (as shown by cp7, cp9, cp11 ... cp29, cp31, cp32 in FIG. 1).

Since a time difference between the sampling signal dsel and the test signal setn is just one period of the input clock signal clkin, and when the sampling signal dsel turns from a high potential to a lower one (as shown by 210 of FIG. 2), the comparator 106 takes out the unit delay signals uds which is just corresponding to a delay level of one period, wherein it is assumed in FIG. 2 that the delay of one period just lies between cp15 and cp17 of the unit delay signals uds. Then the individual unit delay signals are compared in a pair-wise manner so as to generate several compare signals, wherein, if the nth unit delay signal is not equal to the n+1th one, the nth compare signal is in a first state, otherwise, the nth compare signal is in a second state, wherein n is a positive integer. The first state is one of logic 0 and logic 1, while the second state is one of logic 0 and logic 1 which is different from the first state. The result is output to the encoder 108 to be encoded, so as to generate an initial value used as an initial counting state of the counter 122. This initial value is set into the counter 122 when the initial signal ini is at a high potential, at this time the clock recovery circuit enters into a counter reset period (as shown by 204 in FIG. 2 and 304 in FIG. 3). When the clock select signal selc turns from a low potential to a higher one, the first multiplexer 110 turns to provide the input clock signal clkin to the delay chain 112, and the clock recovery circuit therefore turns from the counter reset period to a normal period (as shown by 206 in FIG. 2 and 306 in FIG. 3), that is, the delay locked loop starts to act. Then, the clock recovery circuit begins to approach a locked state step by step from the initial counting state.

As described above, in the timing of each signal shown in FIG. 3, the state of the test signal setn is changed after the enable signal en is enabled; the sampling signal dsel is enabled after the state of the test signal setn is changed; the initial signal ini is enabled after the sampling signal dsel is enabled; and the state of the clock select signal selc is changed after the initial signal ini is enabled.

Figure 4:
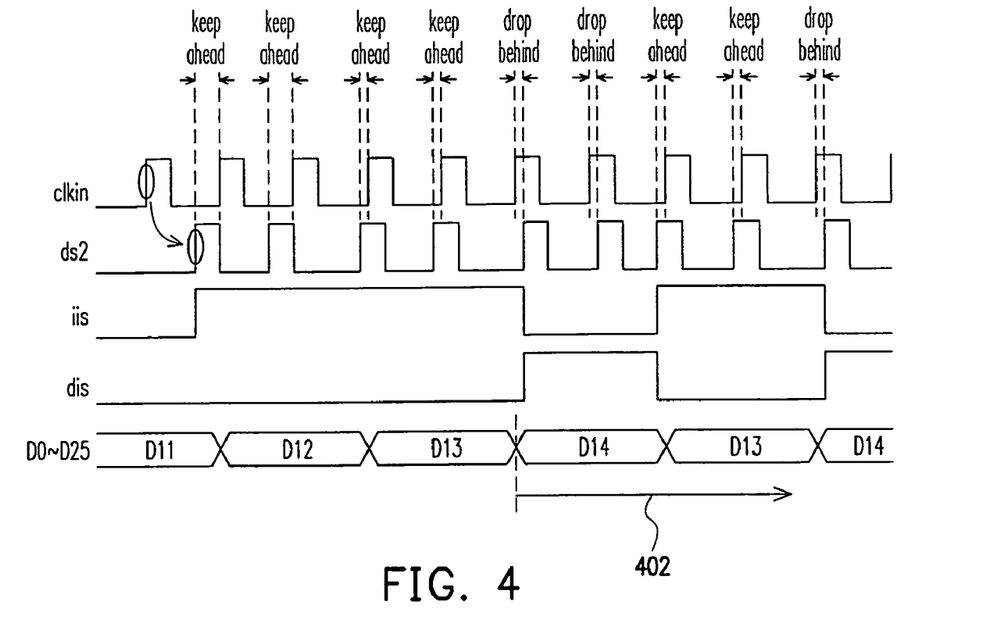
FIG. 4 is a timing diagram of signals of a clock recovery circuit according to a preferred embodiment of the invention.
Figure 5:
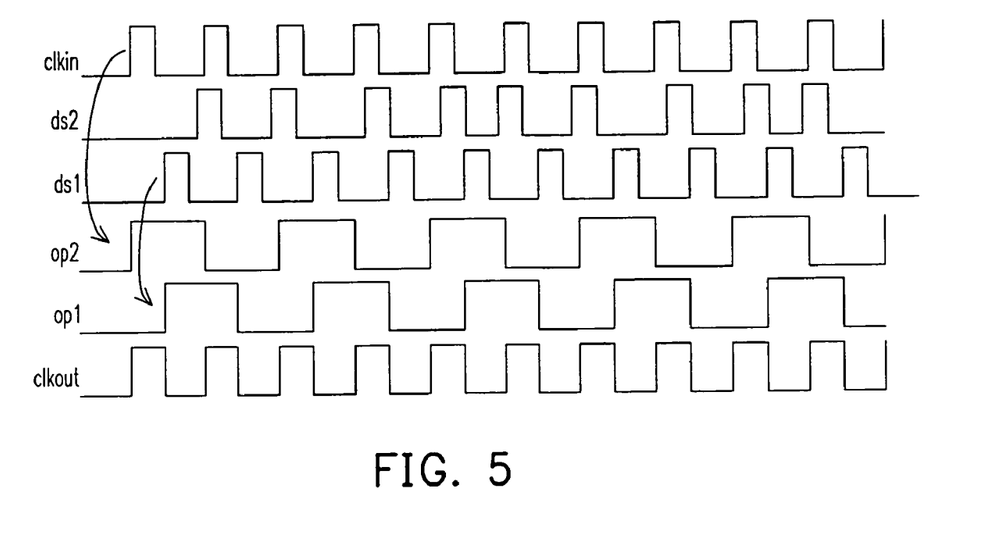
FIG. 5 is a timing diagram of signals of a clock recovery circuit in a locked state according to a preferred embodiment of the invention.

FIG. 4 is a timing diagram of signals of a clock recovery circuit according to a preferred embodiment of the invention, and FIG. 5 is a timing diagram of signals of a clock recovery circuit in a locked state according to a preferred embodiment of the invention. FIGS. 1, 4, and 5 should be referred to jointly in the following description of the embodiments.

In FIG. 1, when the clock select signal selc is at a high potential, the first multiplexer 110 selectively inputs the input clock signal clkin to the delay chain 112, and delays it through the delay chain 112 to generate a first delay signal ds1, a second delay signal ds2, and several unit delay signals uds (cp7, cp9, cp11 ... cp29, cp31, cp32). The delay time of the first delay signal ds1 is a half period of the input clock signal clkin, while the delay time of the second delay signal ds2 is one period of the input clock signal clkin.

The initial value generator 104 receives the unit delay signals uds to generate an initial value, and the phase detector 120 generates an increment indicating signal iis and a decrement indicating signal dis based on the phase difference between the input clock signal clkin and the second delay signal ds2. After being enabled by the initial signal ini, the counter 122 uses the output signal of the second frequency divider 128 as operation frequency, uses the initial value generated by the initial value generator 104 as an initial counting state, and then generates a counting value by counting upwards or downwards based on the increment indicating signal iis and the decrement indicating signal dis.

The first decoder 116 receives the counting value output from the counter 122, and generates several first delay select signals dss1 based on a result from taking off a least significant bit (LSB) from the counting value, while the second decoder 118 generates several second delay select signals dss2 based on the counting value output from the counter 122. And then the delay chain 112 generates a first delay signal ds1 and a second delay signal ds2 respectively based on several first delay select signals dss1 (e.g. S0~S12 as shown in FIG. 1) and several second delay select signals dss2 (e.g. D0~D25 as shown in FIG. 1). And the second delay select signals dss2 control the number of the delay levels of the second delay signal ds2 within the delay chain 112, i.e. the total number of delay units passed through by signals within the delay chain. When the number of the delay level exchanges mutually between certain two level numbers continuously, a locked state is achieved (as shown by 402 in FIG. 4).

Referring to FIG. 5, assuming that the clock recovery circuit is in a locked state and an input clock signal clkin with a duty cycle not equal to 50% is input to the clock recovery circuit, at this time, the phenomenon occurs that the second delay signal ds2 keeps ahead of the input clock signal clkin at one time and drops behind the input clock signal clkin at another time, as shown in FIGS. 4 and 5.

The delay time of the first delay signal ds1 is a half of that of the second delay signal ds2. Since the delay time of the second delay signal ds2 is nearly equal to the time of one period of the input clock signal clkin, the delay time of the first delay signal ds1 is nearly equal to the time of a half period of the input clock signal clkin. Then the frequencies of the first delay signal ds1 and the input clock signal clkin are divided by 2 respectively with the first frequency divider 126 and the second frequency divider 128 as shown in FIG. 1 (as shown by the waveforms of op1 and op2 in FIG. 5), and then a clock output with a duty period of 50%, i.e. an output clkout of the clock recovery circuit (as shown by the waveform of clkout in FIG. 5) may be acquired after passing through the XOR gate 130.

Figure 6:
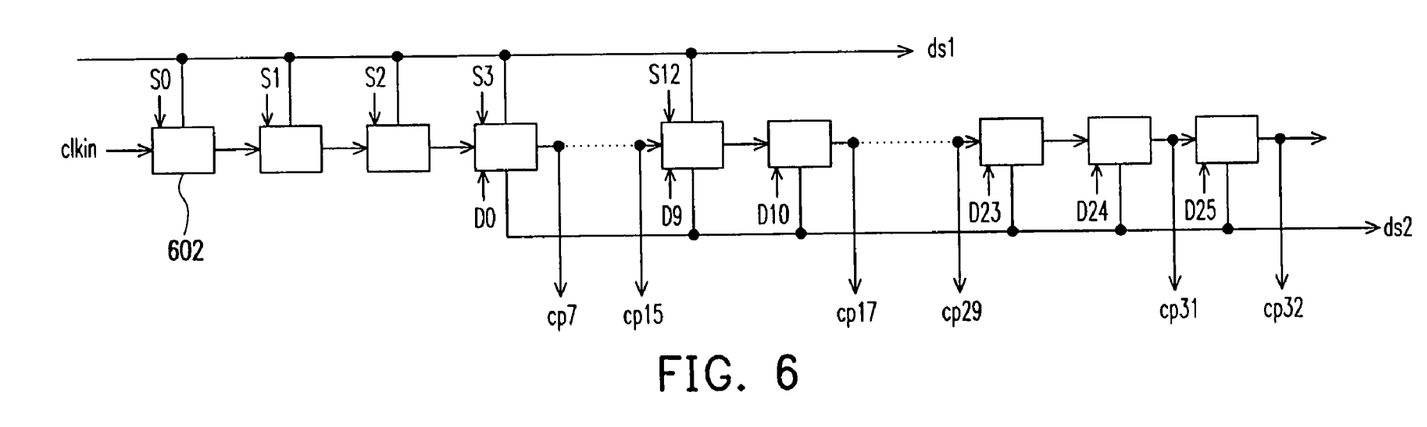
FIG. 6 is a block diagram of the inner devices of the delay chain in a clock recovery circuit according to a preferred embodiment of the invention.

FIG. 6 is a block diagram of the inner devices of the delay chain 112 in the clock recovery circuit according to a preferred embodiment of the invention, and FIGS. 1 and 6 should be referred to jointly. FIG. 6 shows several delay units 602, wherein all the delay units are connected in series with each other. The input end of the first delay unit 602 receives the input clock signal clkin, and then the other delay units receive the clock signal clkin from the previous delay unit in sequence and transmit the input clock signal clkin to the next delay unit 602 in sequence in a series-connected way after delaying it. Each delay unit 602 starting from the first delay unit 602 receives one of the several first delay select signals dss1, that is, from S0 to S12 in sequence.

Each delay unit 602 starting from the fourth delay unit 602, which receives the input clock signal clkin, receives one of the several second delay select signals dss2, that is, from D0 to D25 in sequence. One of the several unit delay signals uds is provided in the position where the fourth delay unit 602 and the fifth delay unit 602 are coupled with each other; one of the several unit delay signals uds is again output every two delay units 602; and each one of the output unit delay signals uds is, in sequence, cp7, cp9, cp11 ... cp29, cp31, cp32, wherein cp32 is output by the last delay unit 602.

The number of several delay units 602 and the delay time of a single delay unit 602 may be designed depending on a resolution desired by a user and on a bandwidth required to be processed. In the scope of the invention, the delay chain is not limited to the design in FIG. 6, instead, a general rule is that each delay unit 602 in a first subset of all the delay units 602 outputs the first delay signal ds1 based on an indication of one of the several first delay select signals dss1 (as shown by S0~S12 of FIG. 1). Each delay unit 602 in a second subset of all the delay units 602 outputs the second delay signal ds2 based on an indication of one of the several second delay select signals dss2 (as shown by D0~D25 of FIG. 1), while the output of each delay unit 602 in a third subset of all the delay units 602 is combined with other ones to form several unit delay signals uds for being provided to the initial value generator 104 to generate an initial counting value.

Figure 7:
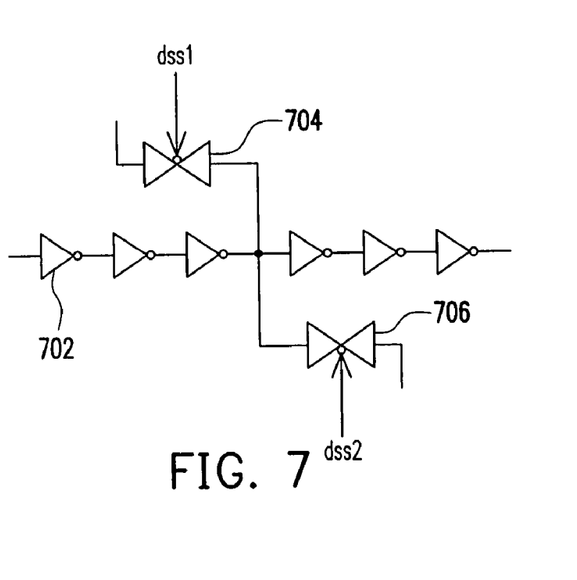
FIG. 7 is an inner circuit diagram of the delay unit in a clock recovery circuit according to a preferred embodiment of the invention.

FIG. 7 is an inner circuit diagram of the delay unit in the clock recovery circuit according to a preferred embodiment of the invention, and FIGS. 6 and 7 should be referred to jointly. FIG. 7 shows a typical delay unit 602 in the delay chain 112, which includes several inverters 702, a first switch 704, and a second switch 706. The several inverters 702 are connected in series with each other, and the first switch 704 and second switch 706 are both coupled to the output end of one of the inverters 702. Whether the first switch 704 needs to be turned on is determined based on the first delay select signals dss1, and the delay unit 602 outputs the first delay signal ds1 when the first switch 704 is turned on. Whether or not the second switch 706 needs to be turned on is determined based on the second delay select signals dss2, and the delay unit 602 outputs the second delay signal ds2 when the second switch 706 is turned on. In this embodiment, not every one of the delay units 602 has a first switch 704 and a second switch 706. If a delay unit does not need to output the first delay signal ds1, a first switch 704 is not required. Similarly, if a delay unit does not need to output the second delay signal ds2, a second switch 706 is also not required.

Figure 8:
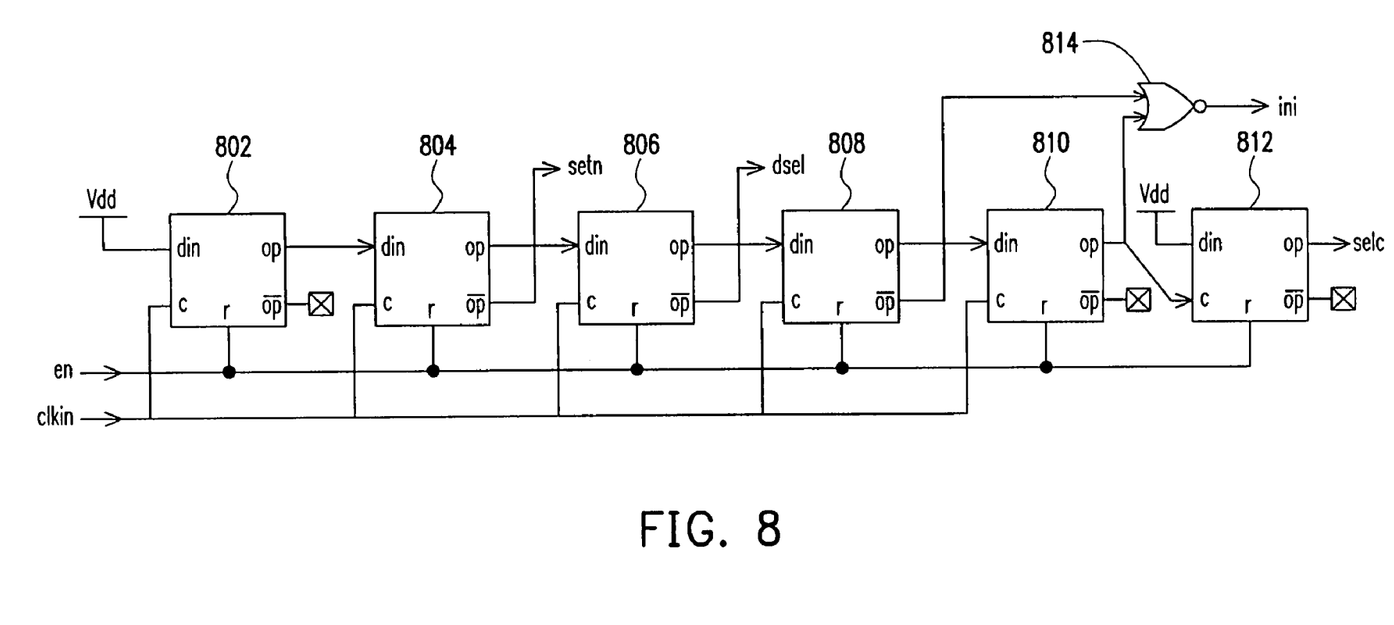
FIG. 8 is an inner circuit diagram of the initial timing generator in a clock recovery circuit according to a preferred embodiment of the invention.

FIG. 8 is an inner circuit diagram of the initial timing generator 102 in the clock recovery circuit according to a preferred embodiment of the invention. Referring to FIG. 8, D Flip-Flops 802, 804, 806, 808, 810, and 812, and an NOR gate 814 are shown. An input end din of the D Flip-Flop 802 is coupled to a power voltage Vdd and an output end op is coupled to an input end din of the D Flip-Flop 804, while an inverse output end/op is not coupled. An output end op of the D Flip-Flop 804 is coupled to an input end din of the D Flip-Flop 806, while the inverse output end/op provides a test signal setn. An output end op of the D Flip-Flop 806 is coupled to an input end din of the D Flip-Flop 808, while the inverse output end/op provides a sampling signal dsel. An output end op of the D Flip-Flop 808 is coupled to an input end din of the D Flip-Flop 810, while the inverse output end/op is coupled to one input end of the NOR gate 814.

An output end op of the D Flip-Flop 810 is coupled to the other input end of the NOR gate 814, and also to a clock end c of the D Flip-Flop 812, so as to provide an operation clock of the D Flip-Flop 812, while the inverse output end/op is not coupled. An input end din of the D Flip-Flop 812 is coupled to the power voltage Vdd and the output end op provides the clock select signal selc, while the inverse output end/op is not coupled. Additionally, each D Flip-Flop receives the enable signal en with its reset end r, while all of the D Flip-Flops 802~810 receive the input clock signal clkin with their clock end c.

The enable signal en as mentioned in FIG. 8 is actually a latching token signal generated by a shift register of a source driver. There are two advantages when using this latching token signal as an enable signal en. The first one is that since the latching token signal exists in each row of each frame, it can be ensured that the clock recovery circuit will be re-initialized in each row by using the latching token signal as an initial set signal of the clock recovery circuit. In addition, when a change suddenly occurs in the clock frequency, the clock recovery circuit may be locked correctly in the next row, so as to reduce the time for an error existing in the frame. The second one is that the clock recovery circuit may be started only when the source driver needs to output a clock by utilizing a suitable latching token signal at the same time, so as to reduce power consumption.

Figure 9:
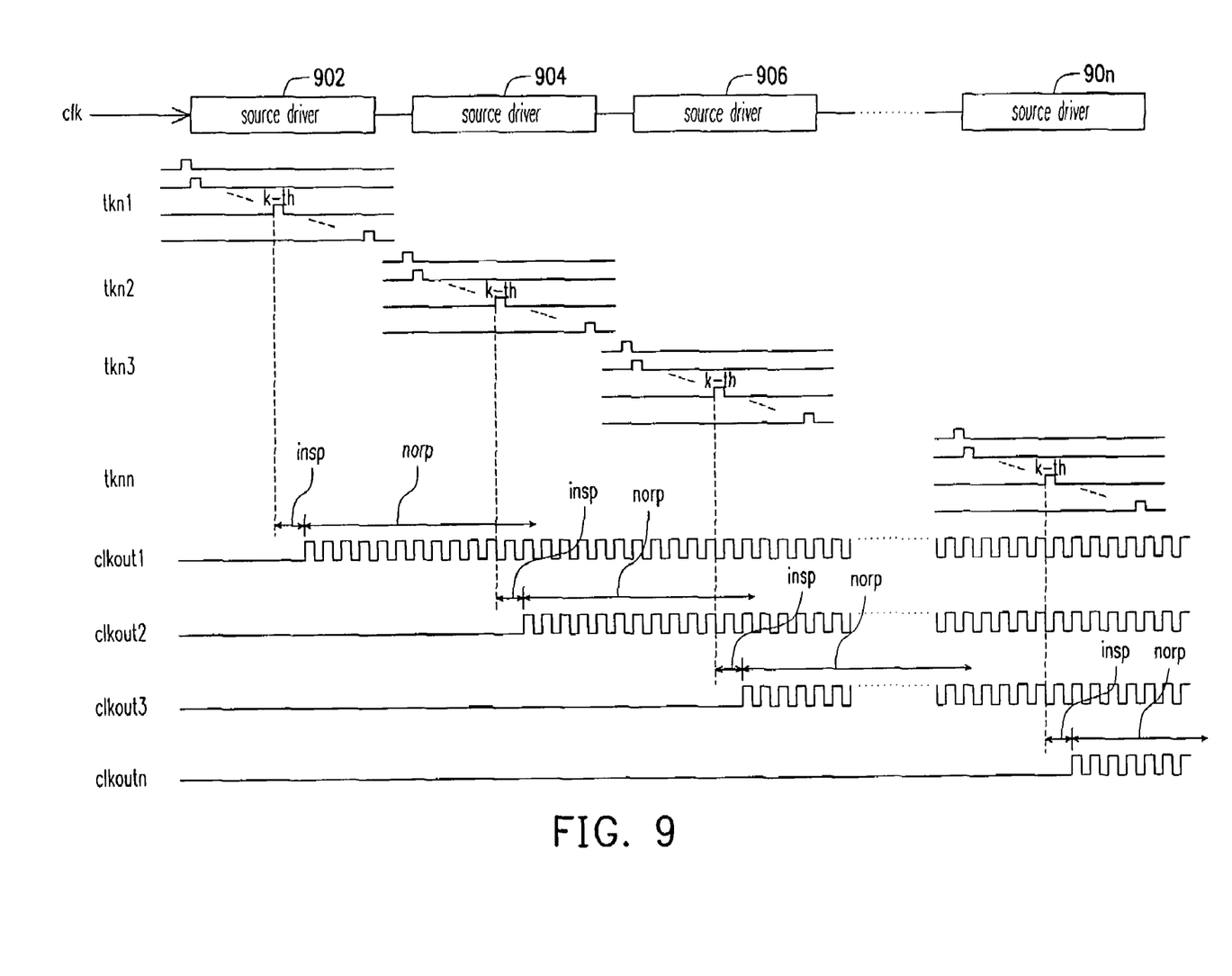
FIG. 9 is a waveform diagram of the enable signal of source drivers adopting a clock recovery circuit according to a preferred embodiment of the invention.

FIG. 9 is a waveform diagram of the enable signal of a source driver adopting the clock recovery circuit according to a preferred embodiment of the invention. Referring to FIG. 8, tkn1~tknn and clkout1~clkoutn are respectively the waveforms of the enable signal (i.e. the latching token signals) en and the output clock signal clkout of the source drivers 902~90n. The design of this embodiment is that the clock recovery circuit is started at the kth latching token signal in each row, and therefore after the kth latching token signal in the source driver 902 is generated, the clock recovery circuit in the source driver 902 begins entering into an initial set period (as shown by insp in FIG. 9) and then into a normal period, i.e. the period when the delay locked loop starts to act (as shown by norp in FIG. 9), and immediately outputs the clock signal, i.e. the output clock signal clkout, and the action of the following source drivers may be deduced by analogy.

Next, the output clock signal clkout of all the source drivers may be optionally stopped, and when the source driver continues to capture the data in the next row of scanning line, similarly, the clock recovery circuit of each source driver is started in sequence thereby outputting the clock signal clkout, such that the object of reducing power consumption can be achieved.

Figure 10:
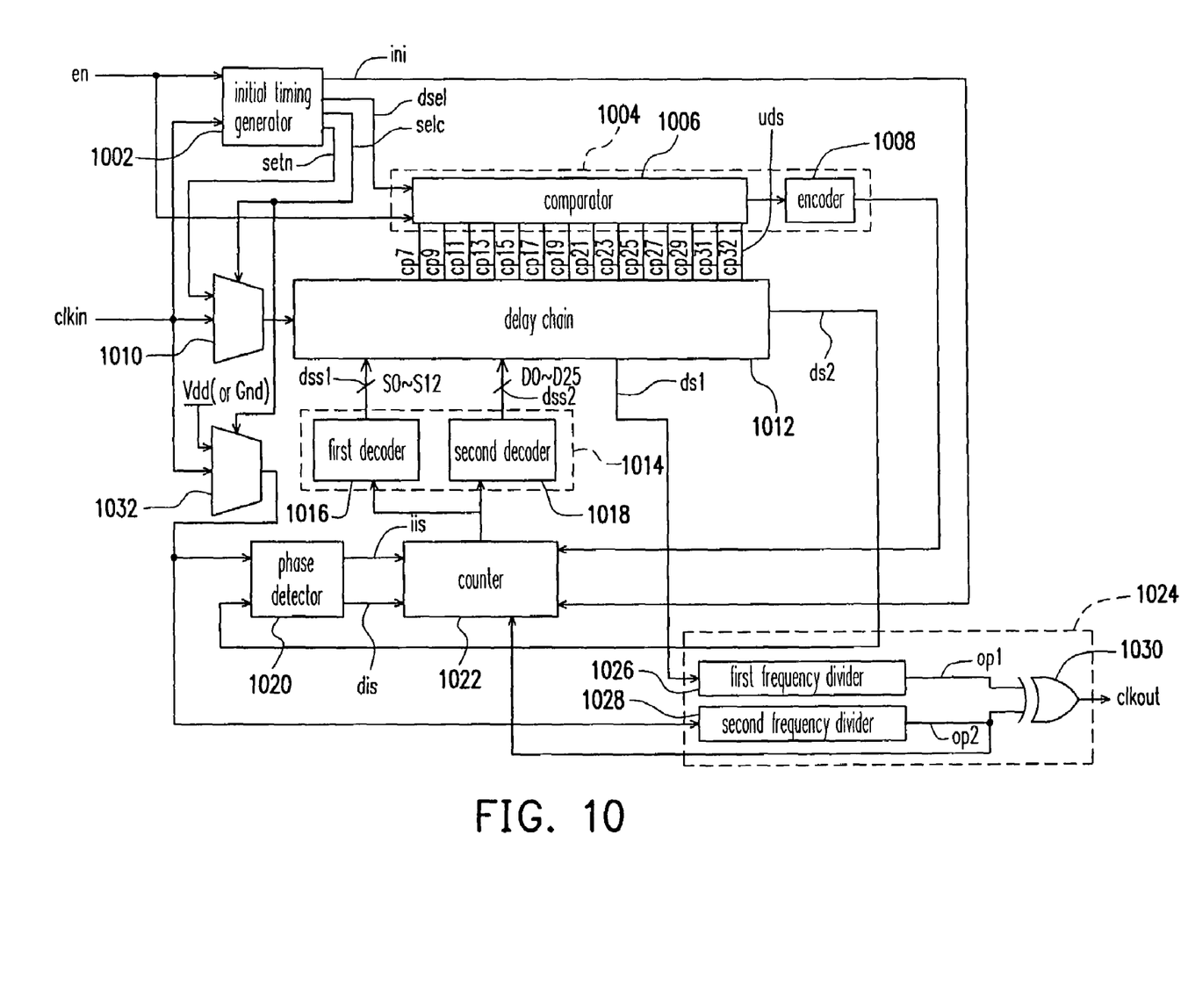
FIG. 10 is a block diagram of a clock recovery circuit device according to another preferred embodiment of the invention.

The clock recovery circuit of FIG. 1 may also be modified optionally by those skilled in the art of clock recovery circuit, for example, an additional multiplexer is added in FIG. 1, as shown in FIG. 10. FIG. 10 is a block diagram of a clock recovery circuit device according to another preferred embodiment of the invention, and FIGS. 1 and 10 should be referred to jointly.

The elements marked by 1002, 1004, 1006, 1008, 1010, 1012, 1014, 1016, 1018, 1020, 1022, 1024, 1026, 1028, and 1030 in FIG. 10 respectively correspond to the elements marked by 102, 104, 106, 108, 110, 112, 114, 116, 118, 120, 122, 124, 126, 128, and 130 in FIG. 1, and their coupling relations and action principles will not be described any more. However, the difference between FIG. 10 and FIG. 1 is that a second multiplexer 1032 is added additionally, and the input clock signal clkin turns to be input to the phase detector 1020 and the second frequency divider 1028 through the second multiplexer 1032. The second multiplexer 1032 determines whether to provide the input clock signal clkin or a preset fixed potential (such as the power voltage Vdd or a ground voltage Gnd) to the second frequency divider 1028 based on the clock select signal selc output from the initial timing generator 1002.

In the state that no action is needed in the clock recovery circuit, the second multiplexer 1032 connects the input of the delay locked loop to the fixed potential, and inputs the input clock signal clkin to the delay locked loop only when an action occurs in the delay locked loop, which further reduces the power consumption of the clock recovery circuit.

Additionally, compared with the embodiment as shown in FIG. 1, the input clock signal clkin in FIG. 1 enters into the delay chain 112 through the first multiplexer 110 and is delayed by the delay chain 112 to generate the first delay signal ds1 and the second delay signal ds2. Since the delay time of the first delay signal ds1 is a half of that of the second delay signal ds2, in practice, when both the first delay signal ds1 and the input clock signal clkin are input to the clock synthesizer circuit 124, the delay time of the first delay signal ds1 will be more than the primarily expected delay time by a half due to the delay of the input clock signal clkin through the multiplexer 110. However, in the embodiment shown in FIG. 10, when being input to the clock synthesizer circuit 1024, the input clock signal clkin is delayed for passing through the second multiplexer 1032 at the same time, and it is assumed that the delay time of the input clock signal clkin caused by its passing through the first multiplexer 1010 is the same as that caused by its passing through the second multiplexer 1032, the first delay signal ds1 will maintain on the primarily expected delay time, thereby the error of the output clock signal clkout with a duty cycle of 50% may be reduced.

Figure 11:
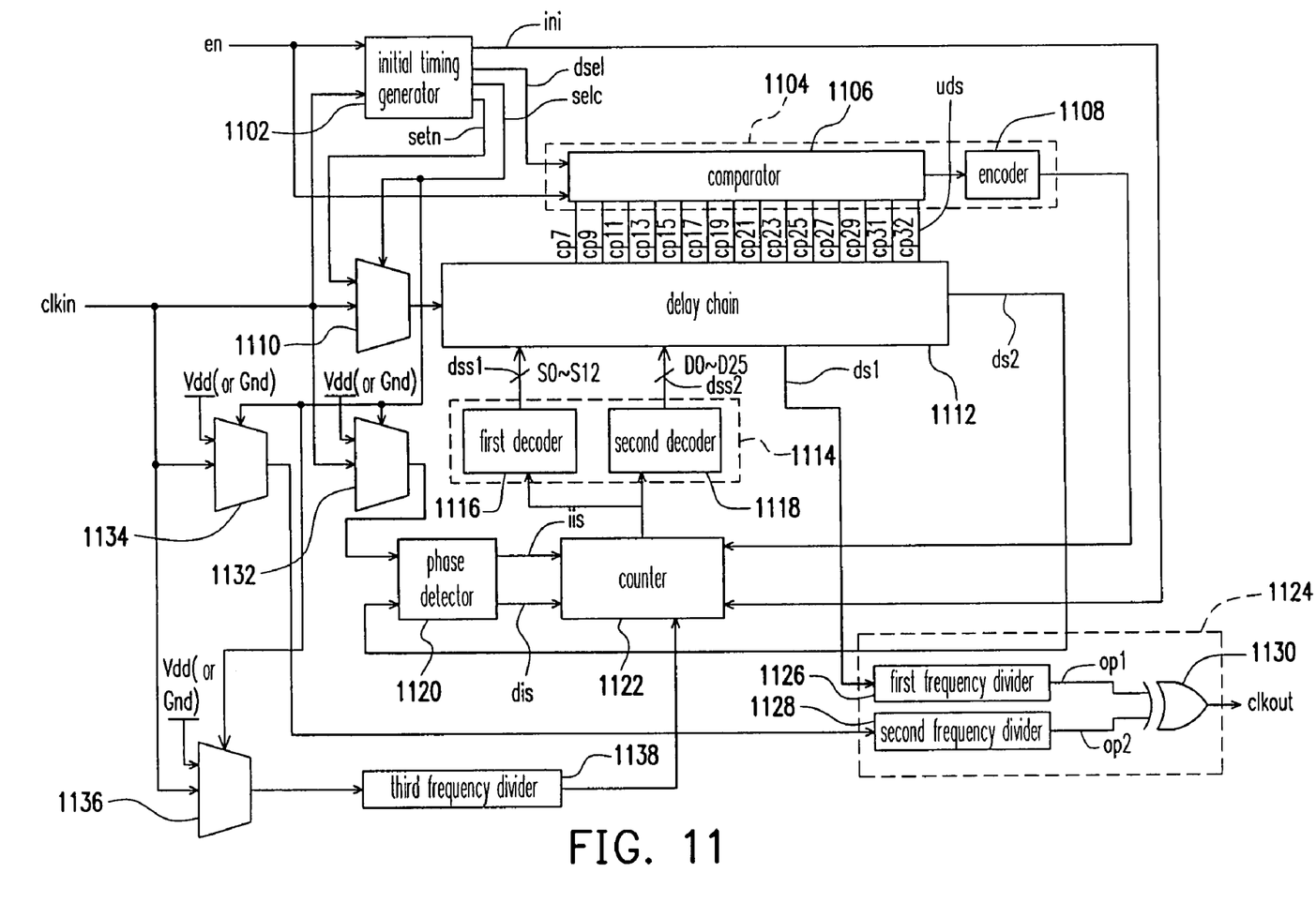
FIG. 11 is a block diagram of a clock recovery circuit device according to another preferred embodiment of the invention.

The clock recovery circuit of FIG. 10 may be further modified optionally by those skilled in the art of the clock recovery circuit; for example, two multiplexers and a frequency divider are added in FIG. 10 as shown in FIG. 11. FIG. 11 is a block diagram of a clock recovery circuit device according to another preferred embodiment of the invention, and FIGS. 10 and 11 should be referred to jointly.

The elements marked by 1102, 1104, 1106, 1108, 1110, 1112, 1114, 1116, 1118, 1120, 1122, 1124, 1126, 1128, 1130, and 1132 in FIG. 11 respectively correspond to the elements marked by 1002, 1004, 1006, 1008, 1010, 1012, 1014, 1016, 1018, 1020, 1022, 1024, 1026, 1028, 1030, and 1032 in FIG. 10, and their coupling relations and action principles will not be described any more. However, the difference between FIGS. 11 and 10 is that a third multiplexer 1134, a fourth multiplexer 1136, and a third frequency divider 1138 are further added, and the input of the second frequency divider 1128 turns to be provided by the input clock signal clkin through the third multiplexer 1134, while the operation frequency of the counter 1122 turns to be provided after the input clock signal clkin is slightly delayed through the fourth multiplexer 1136 and then the clock frequency thereof is divided by 2 through the third frequency divider 1138. An input end of the third multiplexer 1134 and an input end of the fourth multiplexer 1136 are coupled to the fixed potential (such as the power voltage Vdd or the ground voltage Gnd), and whether the input clock signal clkin needs to be provided to the second frequency divider 1128 and the third frequency divider 1138 is determined respectively based on the clock select signal selc output from the initial timing generator 1102.

A third multiplexer 1134 is added in the embodiment of FIG. 10 for the sake of separating the paths of transmitting the input clock signal clkin to the phase detector 1020 and the clock synthesizer circuit 1024 by the second multiplexer 1032, so as to alleviate the problem of mismatched delay caused by different loads on the first multiplexer 1010 and the second multiplexer 1032 when the input clock signal clkin passes through the first multiplexer 1010 and the second multiplexer 1032. Meanwhile, a fourth multiplexer 1136 is added in the embodiment of FIG. 10 for the sake of alleviating the problem of mismatched delay caused by different loads on the first frequency divider 1026 and the second frequency divider 1028.

To sum up, the invention is used to recover an input clock signal with a duty cycle not equal to 50% to an output clock signal with a duty cycle equal to 50% by adopting the initial value generator and the delay locked loop, and to output the data signal within the source driver which is synchronized by the output clock signal to the source driver of the next level, and therefore the limitation of the number of stages of the series-connected source drivers is removed. Additionally, the above initial value generator may provide a suitable initial counting value such that the delay time of the second delay signal is extremely approximate to one period of the input clock signal just from the beginning, therefore the problem of harmonic lock can be avoided. In addition, the function of saving power consumption can also be achieved by adopting the clock recovery circuit of the invention in the source driver circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A clock recovery circuit, comprising:
   a delay locked loop for receiving an input signal and outputting a first delay signal and several unit delay signals resulted from delaying the input signal, wherein the delay time of the first delay signal is determined based on a counting value, and the delay time of each one of the unit delay signals is longer than that of the previous unit delay signal;
   an initial delay select circuit for providing an initial value used as the initial counting value to the delay locked loop based on the unit delay signals; and
   a clock synthesizer circuit for generating an output clock signal based on an input clock signal and the first delay signal, wherein the frequency of the output clock signal is substantially the same as that of the input clock signal, and the duty cycle of the output clock signal is approximate to a preset value.

2. The clock recovery circuit as claimed in claim 1, wherein the initial delay select circuit comprises:
   an initial timing generator for generating an initial signal, a sampling signal, a clock select signal, and a test signal based on an enable signal and the input clock signal, wherein the delay locked loop acquires the initial value when the initial signal is enabled;
   an initial value generator for generating the initial value based on the unit delay signals when the sampling signal is enabled; and
   a first multiplexer for outputting one of the test signal and the input clock signal to the delay locked loop as the input signal based on the clock select signal.

3. The clock recovery circuit as claimed in claim 2, wherein the state of the test signal is changed after the enable signal is enabled, the sampling signal is enabled after the state of the test signal is changed, the initial signal is enabled after the sampling signal is enabled, and the state of the clock select signal is changed after the initial signal is enabled.

4. The clock recovery circuit as claimed in claim 2, wherein the initial value generator comprises:
   a comparator for generating several compare signals based on the unit delay signals when the sampling signal is enabled, wherein, if the nth unit delay signal is not equal to the n+1th unit delay signal, the nth compare signal is in a first state, otherwise, the nth compare signal is in a second state, and n is a positive integer; and
   an encoder for generating the initial value based on the compare signals.

5. The clock recovery circuit as claimed in claim 4, wherein the first state is one of logic 0 and logic 1, while the second state is the other one of logic 0 and logic 1.

6. The clock recovery circuit as claimed in claim 2, wherein the enable signal is a latching token signal generated by a shift register of a source driver circuit.

7. The clock recovery circuit as claimed in claim 1, wherein the delay locked loop comprises:
   a delay chain for providing the first delay signal, a second delay signal, and the unit delay signals resulted from delaying the input signal, wherein the delay time of the first delay signal is determined based on several first delay select signals, while the delay time of the second delay signal is determined based on several second delay select signals;
   a phase detector for providing an increment indicating signal and a decrement indicating signal based on a phase difference between the input clock signal and the second delay signal;
   a counter for outputting the counting value, capturing the initial value as the counting value when an initial signal provided by the initial delay select circuit is enabled, and increasing or decreasing the counting value based on the increment indicating signal and the decrement indicating signal; and
   a decoder circuit for generating the first delay select signals and the second delay select signals based on the counting value.

8. The clock recovery circuit as claimed in claim 7, wherein the delay chain comprises several delay units, and the first delay unit delays the input signal and then outputs it, while each of the rest of the delay units delays the signal output from the previous delay unit and then outputs it; additionally
   each delay unit in a first subset of the delay units outputs the first delay signal respectively based on the indication of one of the first delay select signals;
   each delay unit in a second subset of the delay units outputs the second delay signal respectively based on the indication of one of the second delay select signals;
   the unit delay signals comprise the output signals of a third subset of the delay units.

9. The clock recovery circuit as claimed in claim 8, wherein each of the delay units comprises at least one inverter connected in series between the input end and the output end of the delay unit.

10. The clock recovery circuit as claimed in claim 9, wherein if the delay unit is belonged to the first subset, the delay unit further comprises:
    a first switch coupled to the output end of one of the inverters, being turned on or turned off based on the corresponding first delay select signal, and outputting the first delay signal when turned on.

11. The clock recovery circuit as claimed in claim 9, wherein if the delay unit is belonged to the second subset, the delay unit further comprises:
    a second switch coupled to the output end of one of the inverters, being turned on or turned off based on the corresponding second delay select signal, and outputting the second delay signal when turned on.

12. The clock recovery circuit as claimed in claim 7, wherein the decoder circuit comprises:
    a first decoder for generating the first delay select signals based on a result from taking off the least significant bits from the counting value; and
    a second decoder for generating the second delay select signals based on the counting value.

13. The clock recovery circuit as claimed in claim 7, further comprising:
    a second multiplexer for transmitting the input clock signal to the phase detector and the clock synthesizer circuit based on a clock select signal provided by the initial delay select circuit.

14. The clock recovery circuit as claimed in claim 7, further comprising:
    a second multiplexer for transmitting the input clock signal to the phase detector based on a clock select signal provided by the initial delay select circuit;
    a third multiplexer for transmitting the input clock signal to the clock synthesizer circuit based on the clock select signal;
    a fourth multiplexer for outputting the input clock signal based on the clock select signal; and
    a third frequency divider for outputting a signal resulted from dividing the frequency of the input clock signal output from the fourth multiplexer by 2 as the operation frequency of the counter.

15. The clock recovery circuit as claimed in claim 1, wherein the delay time of the first delay signal is about a half period of the input signal, and the preset value is about 50%.

16. The clock recovery circuit as claimed in claim 15, wherein the clock synthesizer circuit comprises:
    a first frequency divider for outputting an output signal resulted from dividing the frequency of the first delay signal by 2;
    a second frequency divider for outputting another output signal resulted from dividing the frequency of the input clock signal by 2; and
    an XOR gate for receiving the output signals from the first frequency divider and the second frequency divider and generating the output clock signal.

* * * * *